Jan. 30, 1968 D. O. BARD ET AL 3,365,958
COMBINED FLUID DYNAMIC AND FLUID STATIC BEARING AND
GYROSCOPE EMBODYING THE SAME
Filed Aug. 27, 1964 4 Sheets-Sheet 1

INVENTORS
DONALD O. BARD &
BY ALEX R. SEIZEW

*Harness and Harris*
ATTORNEYS

Jan. 30, 1968   D. O. BARD ET AL   3,365,958
COMBINED FLUID DYNAMIC AND FLUID STATIC BEARING AND
GYROSCOPE EMBODYING THE SAME
Filed Aug. 27, 1964   4 Sheets-Sheet 2

INVENTORS
DONALD O. BARD &
ALEX R. SEIZEW
BY
*Harness and Harris*
ATTORNEYS

Jan. 30, 1968    D. O. BARD ET AL    3,365,958
COMBINED FLUID DYNAMIC AND FLUID STATIC BEARING AND
GYROSCOPE EMBODYING THE SAME
Filed Aug. 27, 1964    4 Sheets-Sheet 4

INVENTORS
DONALD O. BARD &
BY ALEX R. SEIZEW

Harness + Harris

ATTORNEYS

3,365,958
COMBINED FLUID DYNAMIC AND FLUID STATIC BEARING AND GYROSCOPE EMBODYING THE SAME
Donald O. Bard, Macomb Township, Macomb County, and Alex R. Seizew, Warren, Mich., assignors to Chrysler Corporation, Highland Park, Mich., a corporation of Delaware
Filed Aug. 27, 1964, Ser. No. 392,439
16 Claims. (Cl. 74—5)

This invention relates to fluid bearings and particularly to gyroscopes embodying fluid bearings.

It has heretofore been suggested that a rotating element such as the rotating element of a gyroscope can be supported by the use of pneumatic static bearings. One of the problems with such a bearing is that it requires the use of an external compressor or pump to provide the fluid under pressure.

It is an object of this invention to provide a fluid bearing which obviates the need for an external compressor or pump.

It is a further object of the invention to provide a gyroscope wherein the stabilized element is supported by a fluid static bearing and the need for an external compressor or pump is eliminated.

It is a further object of the invention to provide a fluid bearing wherein a fluid dynamic bearing is utilized to support a rotor and also to supply fluid under pressure to a fluid static bearing to support a rotating element.

It is a further object of the invention to provide a gyroscope which combines a fluid dynamic bearing with a fluid static bearing to support rotatably and element without the need for an external compressor or pump.

It is a further object of the invention to provide a gyroscope having a novel configuration.

Figure 1:
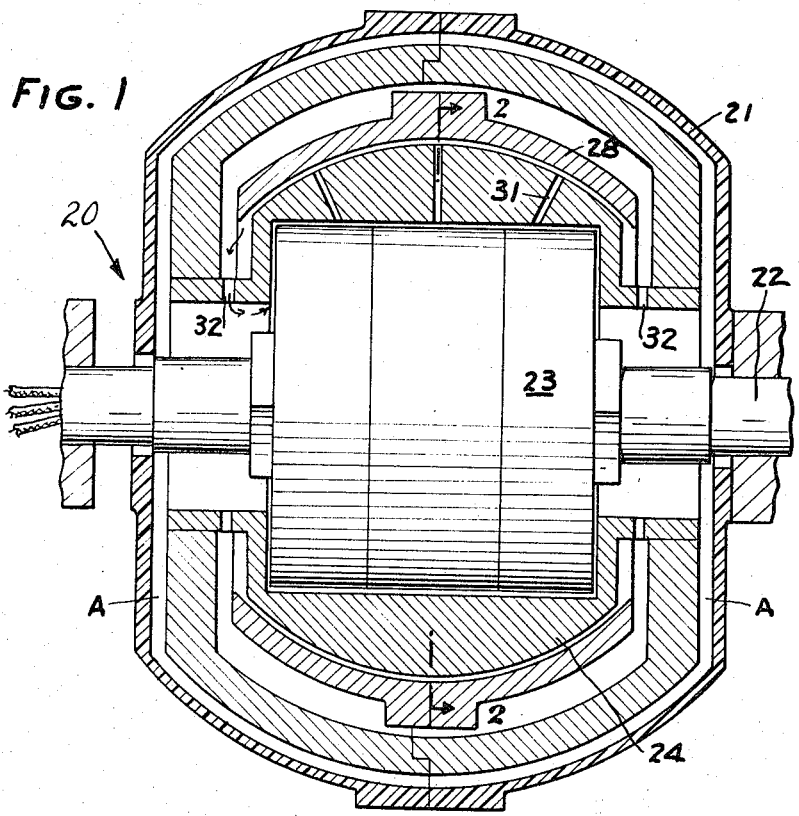
FIG. 1 is a longitudinal sectional view of a gyroscope embodying the invention.
Figure 2:
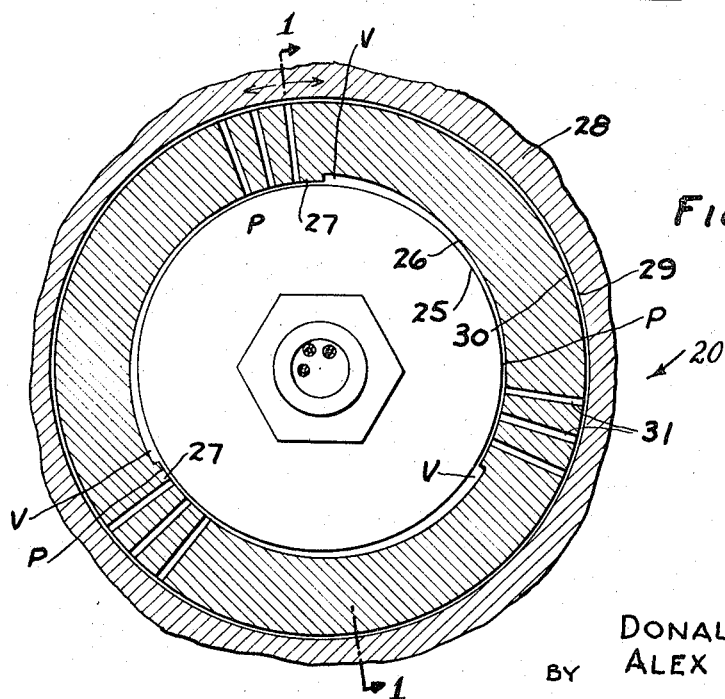
FIG. 2 is a sectional view taken along the line 2—2 in FIG. 1.

Referring to FIGS. 1 and 2, the gyroscope 20 embodying the invention comprises a housing 21 in which a stator 22 is mounted in fixed relation. The stator 22 supports windings 23 which are adapted to be energized to cause rotation of a rotor 24 which surrounds the stator 22.

As shown in FIG. 2, rotor 24 includes an inner cylindrical surface 26 which cooperates with a generally cylindrical surface 25 of the stator 22, as presently described, to form a fluid dynamic bearing between the surfaces 25, 26. Specifically, the surface 26 of the rotor 24 is formed with lands or wedges 27 so that stator 22 is energized to rotate the rotor 24 relative to the stator 22, the wedges 27 produce areas P of relatively high pressure and areas V of relatively low pressure or vacuum.

A gyro element 28 surrounds the rotor 24. Gyro element 28 includes an inner spherical surface 29 that cooperates with the outer spherical surface 30 of the rotor 24 and is juxtaposed relative thereto.

Rotor 24 is provided with ports or passages 31 which extend from the area P of relatively high pressure to the area between the surfaces 29, 30 to form a fluid static bearing between the surfaces 29, 30. The air passes axially outwardly from between the surfaces 29, 30 and is drawn into the area V between the surfaces 25, 26 through return passages 32 so that an internal circulation occurs within the housing 21 between the dynamic and static bearings. The plurality of wedges 27 and cooperating areas produces a plurality of areas P of relative high pressure and areas V of relatively low pressure.

When the stator 22 is energized, the rotor 24 rotates, creating pressure in the fluid dynamic bearing between the surfaces 25, 26 and providing fluid through passages 31 to the area between the surfaces 29, 30 to provide a fluid static bearing that supports the gyro element 28 in spaced relation to the rotor 24. As the rotor 24 rotates, the gyro element 28 also rotates at the same speed as the rotor, due to the viscous drag of the fluid.

It can thus be seen that there has been provided a gyroscope wherein the gyroscopic element is supported by a fluid static bearing which, in turn, is supplied by fluid, preferably air, by a fluid dynamic bearing within the gyroscope.

No external fluid supply is required to either support the rotor or the gyroscopic element. The only requirement is a source of electrical power to energize the stator 22.

In a typical example of a gyroscope embodying the invention, the stator comprises a two pole, three phase, 400 cycle, Y connected synchronous hysteresis type stator. The laminations have twelve to eighteen slots with two coils per slot. The synchronous speed of a motor of this type was rated at 24,000 r.p.m. The rotor consisted of a thin-walled steel member.

Figure 3:
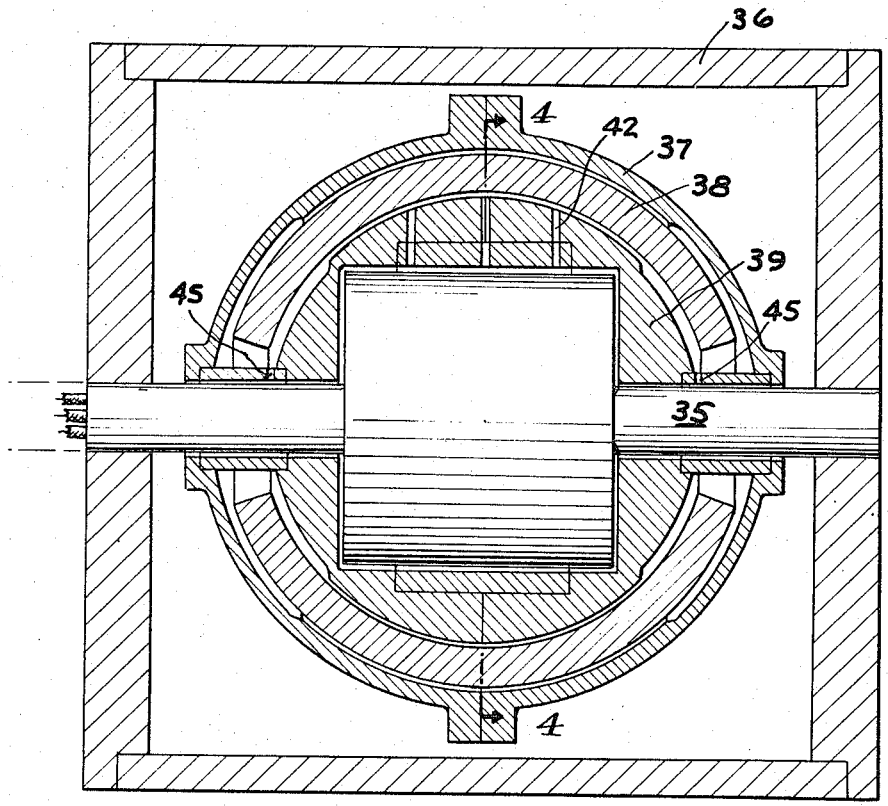
FIG. 3 is a longitudinal sectional view of a modified form of the gyroscope embodying the invention.
Figure 4:
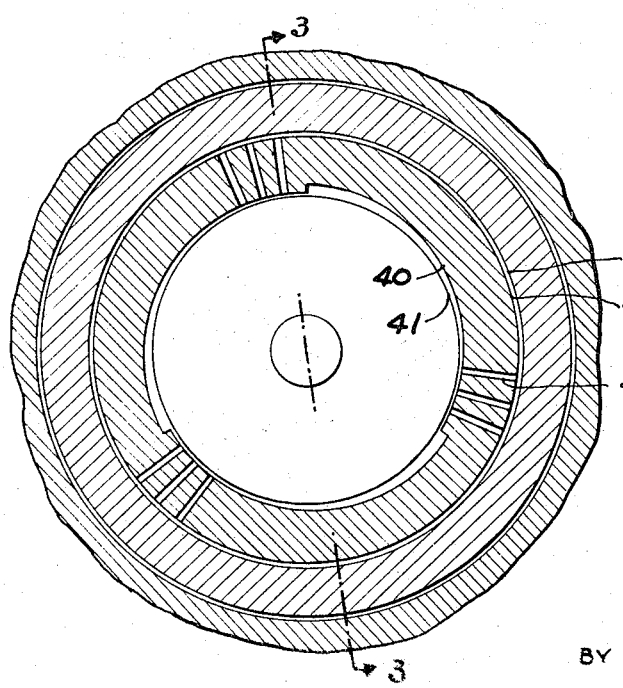
FIG. 4 is a sectional view taken along the line 4—4 in FIG. 5.

In the form of the invention shown in FIG. 3, the stator 35 is fixed in an outer housing 36. Inner housing 37, rotor 39 and gyro element 38 are substantially spherical in shape. As in the previous form of the invention, the surfaces 40, 41 between the rotor 39 and stator 35 define a fluid dynamic bearing which supplies air through the ports 42 to the surfaces 43, 44 between the rotor 39 and gyro element 38 to define a fluid static bearing. Circulation of the fluid, such as air, occurs from the area between the surfaces 40, 41 through the openings 42 to the surfaces 43, 44 and thereafter externally within the inner housing 37 through spaces 45 back to the area between the surfaces 40, 41.

Figure 5:
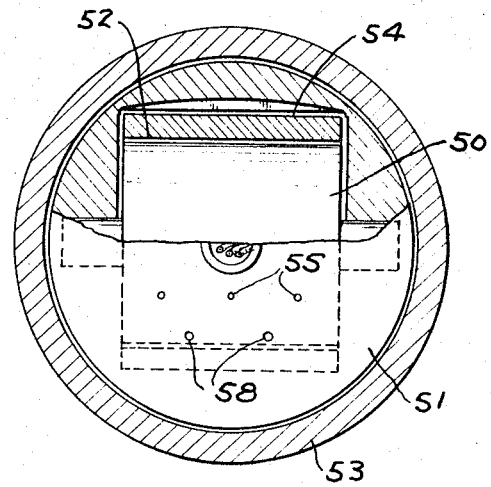
FIG. 5 is a transverse sectional view through a modified form of gyroscope embodying the invention.
Figure 6:
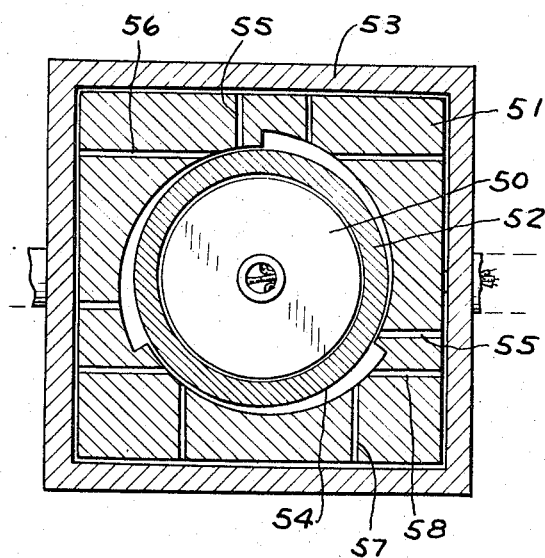
FIG. 6 is a longitudinal sectional view of the form of gyroscope shown in FIG. 5.

A single degree of freedom gyroscope embodying the invention is shown in FIGS. 5 and 6 and comprises a stator 50 fixed in an inner cylindrical housing 51 with its axis at right angles to the inner housing 51. A rotor 52 of generally cylindrical configuration is positioned intermediate the stator 50 and the inner housing 51. In turn the inner housing 51 is positioned within a cylindrical outer housing 53. Wedges 54 are provided on the inner surface of the inner housing 51 adjacent the outer surface of the rotor 52. Passageways 55, 56 extend from the areas of relatively high pressures to the axial and peripheral surfaces of the inner housing 51 to support the inner housing 51 relative to the outer housing 53. Return air passages 57, 58 extend to the areas of relatively low pressure. In operation, energization of stator causes the rotor to rotate and supply air for supporting the inner housing within the outer housing. The gyroscope can be provided with optical, electrical or magnetic type read out systems as is well known with gyroscopes. Instead of utilizing passages formed in the housing 51, other channel means may be provided as will be apparent to persons skilled in the art with the present disclosure before them.

Figure 7:
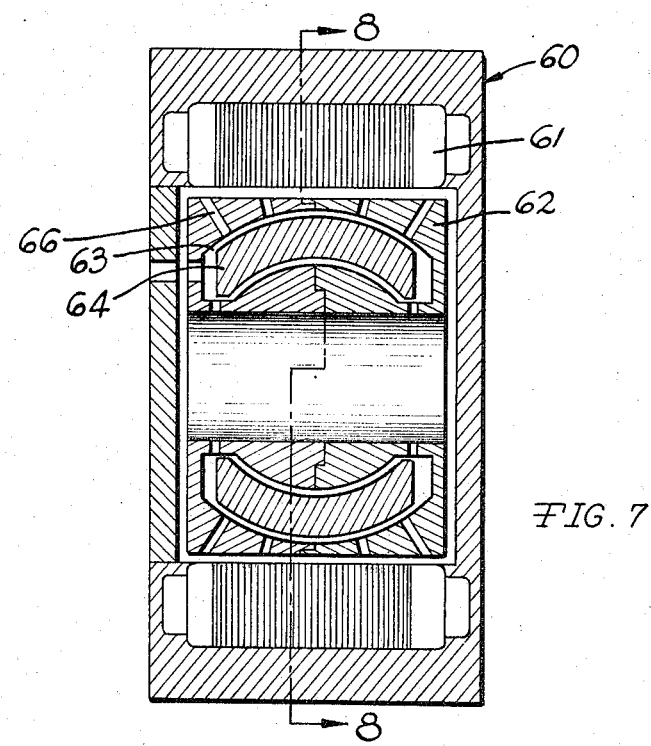
FIG. 7 is a longitudinal sectional view of a further modified form of gyroscope embodying the invention.
Figure 8:
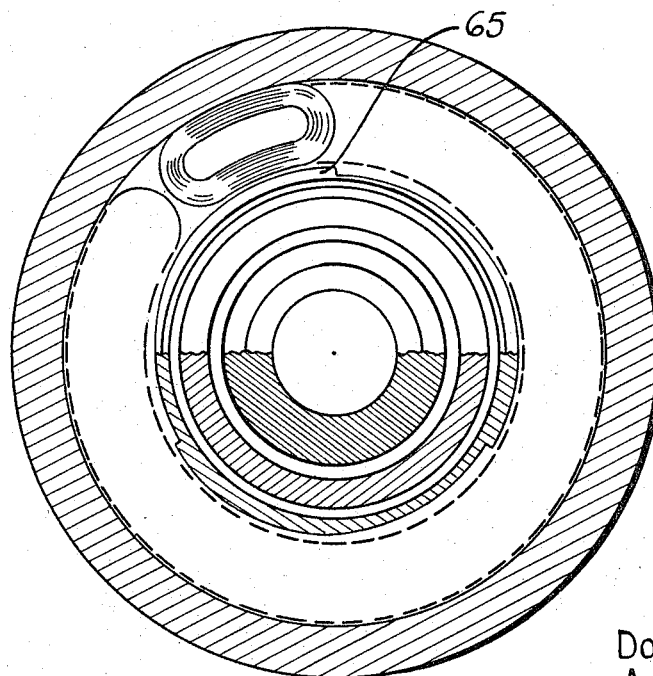
FIG. 8 is a sectional view taken along the line 8—8 in FIG. 7.

In the form of the invention shown in FIGS. 7 and 8, the stator 61 is mounted in the housing 60 and surrounds the rotor 62. The rotor 62 includes an annular space 63 in which the gyroscopic element 64 is positioned. The external surface of the rotor 62 is formed with lands or wedges 65 which cooperate with the adjacent surface to provide air under pressure through passages 66 against the external surface of the gyroscopic element 64 to support the element in spaced relation to the rotor 62.

We claim:
1. The combination comprising
a first member,
a second member surrounding said first member,
said first and second member defining a pair of juxtaposed surfaces,
a third member surrounding said second member,
said second and third members defining another pair of juxtaposed surfaces,
one of said first and third members being rotatably fixed and the other of said first and third members and said second member being rotatable,
one pair of said surfaces between said fixed member and said second member being adapted to define a plurality of areas of relatively high pressure between said surfaces as rotation occurs,
said second member having openings extending therethrough from said areas of high pressure to the space between the other pair of juxtaposed surfaces,
whereby the fluid from said high pressure areas passes to said space between said other pair of surfaces to statically support said other and said first and third members.

2. The combination comprising
a first rotatably fixed member,
a second member surrounding said first member and adapted to rotate relative thereto,
said first and second member defining a pair of juxtaposed surfaces,
a third member surrounding said second member,
said second and third members defiining another pair of juxtaposed surfaces with a space therebetween,
said third member being rotatable,
said pair of surfaces between said fixed member and said second member being adapted to define a plurality of areas of relatively high pressure between said surfaces as rotation occurs,
and means for directing fluid from said high pressure areas to said space between said other pair of surfaces to statically support said third member.

3. The combination set forth in claim 2 wherein one of said pair of surfaces between said fixed member and said second member has wedges thereon extending parallel to the axis of rotation of said second member defining said plurality of areas of relatively high pressure as the second member.

4. The combination comprising
a first member,
a second member surrounding said first member,
said first and second member defining a pair of juxtaposed surfaces,
a third member surrounding said second member,
said second and third members defining another pair of juxtaposed surfaces,
one of said first and third members being rotatably fixed and the other of said first and third members and said second member being rotatable,
one pair of said surfaces between said fixed member and said second member being adapted to define a plurality of areas of relatively high pressure between said surfaces as rotation occurs,
means for directing fluid from said high pressure areas to the space between said other pair of surfaces to statically support said other of said first and third members,
and a housing surrounding said first and third members.

5. The combination comprising
a first fixed stator,
a second member surrounding said first member and adapted to rotate relative thereto,
means for energizing said stator to rotate said second member,
said stator and second member defining a pair of juxtaposed surfaces,
a third member surrounding said second member,
said second and third members defining another pair of juxtaposed surfaces,
said third member being rotatable,
said pair of said surfaces between said stator and said second member being adapted to define a plurality of areas of relatively high pressure between said surfaces as rotation occurs,
said second member having openings extending therethrough from the area of high presusre to the other pair of juxtaposed surfaces,
whereby the fluid from the high pressure areas passes to the area between said other pair of surfaces to statically support said third member.

6. The combination comprising
means defining a first pair of juxtaposed surfaces having a common axis,
means defining a second pair of surfaces having an identical common axis,
means for rotating said first pair of surfaces relative to one another to create a fluid dynamic bearing between said surfaces having a plurality of areas of relatively high pressure,
and means for directing fluid from said areas of high pressure between said second pair of surfaces to define a fluid static bearing.

7. The combination comprising
means including an electrical stator and a member sur-surrounding said stator defining a first pair of justaposed surfaces having a common axis,
means defining a second pair of surfaces having an identical common axis,
said stator being energizable to cause said member to rotate and create a fluid dynamic bearing between said surfaces having a plurality of areas of relatively high pressure,
and means for directing fluid from said areas of high pressure between said second pair of surfaces to define a fluid static bearing.

8. The combination comprising
a first member,
a second member surrounding said first member,
said first and second member defining a pair of juxtaposed spherical surfaces,
a third member surrounding said second member,
said second and third members defining another pair of juxtaposed spherical surfaces.
one of said first and third members being rotatably fixed and the other of said first and third members and said second member being rotatable,
one pair of said surfaces between said fixed member and said second member being adapted to define a plurality of areas of relatively high pressure between said surfaces as rotation occurs,
said second member having openings extending therethrough from the areas of high pressure to the other pair of juxtaposed surfaces,
whereby the fluid from the high pressure areas passes to the area between said other pair of surfaces to statically support said other of said first and third members.

9. The combination comprising
a first member,
a second member surrounding said first member and adapted to rotate relative thereto,
said first and second member defining a pair of juxtaposed cylindrical surfaces,
a third member surrounding said second member, said second and third members defining another pair of juxtaposed cylindrical surfaces, one pair of said surfaces having relative rotation to define a plurality of areas of relatively high pressure between said surfaces as rotation occurs, a housing surrounding said members, and means for directing fluid from the area of high pressure to the other pair of juxtaposed surfaces, whereby the fluid from the high pressure areas passes to the area between said other pair of surfaces to statically support said third member.

10. In a gyroscope, the combination comprising a first member, a second member surrounding said first member, said first and second member defining a pair of juxtaposed surfaces, a third member surrounding said second member, said second and third members defining another pair of juxtaposed surfaces, one of said first and third members defining an electrical stator and the other of said first and third members being rotatable, said electric stator being energizable to rotate said second member, one pair of said surfaces between said stator and said second member being adapted to define a plurality of areas of relatively high pressure between said surfaces as rotation occurs, said second member having openings extending therethrough from the areas of high pressure to the other pair of juxtaposed surfaces, whereby the fluid from the high pressure areas passes to the area between said other pair of surfaces to statically support said other of said first and second members.

11. In a gyroscope, the combination comprising a first stator member, a second member surrounding said first member and adapted to rotate relative thereto, said first and second member defining a pair of juxtaposed surfaces, said stator member being energizable to rotate said second member, a third gyro member surrounding said second member, said second and third members defining another pair of juxtaposed surfaces, said third member being rotatable, said pair of surfaces between said stator member and said second member being adapted to define a plurality of areas of relatively high pressure between said surfaces as rotation occurs, and means for directing fluid from the high pressure areas to the areas between said other pair of surfaces to statically support said third gyro member.

12. The combination set forth in claim 11 wherein one of said surfaces between said stator and said second member has wedges thereon defining said areas of high pressure.

13. In a gyroscope, the combination comprising a fixed stator member, a rotor surrounding said stator and adapted to rotate relative thereto, said stator and rotor defining a pair of juxtaposed surfaces, a gyro element surrounding said rotor and rotatable relative thereto, said rotor and gyro element defining another pair of juxtaposed spherical surfaces, said surfaces between said stator and said rotor defining a plurality of areas of relatively high pressure between said surfaces as rotation of said rotor occurs when said stator is energized, and means for directing fluid from the high pressure areas to the areas between said other pair of surfaces.

14. In a gyroscope, the combination comprising a rotatably fixed electrical stator, a rotor surrounding said stator and adapted to rotate relative thereto, said stator and rotor defining a pair of juxtaposed surfaces, said stator being energizable to rotate said rotor, a gyro element surrounding said rotor, said rotor and gyro element defining another pair of juxtaposed spherical surfaces, said surfaces between said stator and said rotor defining a plurality of areas of relatively high pressure between said surfaces as rotation occurs, said rotor having generally radial openings extending therethrough from the areas of high pressure to the other pair of juxtaposed surfaces, whereby the fluid from the high pressure areas passes to the areas between said rotor and gyro element to statically support said gyro element.

15. In a gyroscope, the combination comprising a fixed electrical stator, a rotor surrounding said stator and adapted to rotate relative thereto, said stator being energizable to rotate said rotor, means defining a fluid bearing between said stator and said rotor, a gyro element surrounding said rotor, and means defining a fluid bearing between said rotor and gyro element.

16. In a gyroscope, the combination comprising a rotatably fixed electrical stator, a rotor surrounding said stator and adapted to rotate relative thereto, said stator and rotor defining a pair of juxtaposed surfaces, said stator being energizable to rotate said rotor, a gyro element surrounding said rotor, said rotor and gyro element defining another pair of juxtaposed spherical surfaces, said surfaces between said stator and said rotor defining a plurality of areas of relatively high pressure between said surfaces as rotation occurs, said rotor having generally radial openings extending therethrough from the areas of high pressure to the other pair of juxtaposed surfaces, whereby the fluid from the high pressure areas passes to the areas between said rotor and gyro element to statically support said gyro element, and a housing surrounding said stator, rotor and gyro element.

References Cited
UNITED STATES PATENTS 3,043,635 2/1960 Bard _____ 308—9
3,048,043 8/1962 Slater et al. _____ 74—5

FRED C. MATTERN, Jr., *Primary Examiner.*

J. PUFFER, C. J. HUSAR, *Assistant Examiners.*